No. 656,927. Patented Aug. 28, 1900.
M. A. BIVER & A. F. HÉNARD.
CHAMBER WITH MIRROR WALLS.
(Application filed May 22, 1900.)

(No Model.) 2 Sheets—Sheet 1.

WITNESSES

INVENTORS
Mathias Alfred Biver
Alfred Eugène Hénard
BY
Howson and Howson
ATTORNEYS No. 656,927. Patented Aug. 28, 1900.
M. A. BIVER & A. E. HÉNARD.
CHAMBER WITH MIRROR WALLS.
(Application filed May 22, 1900.)

(No Model.) 2 Sheets—Sheet 2.

WITNESSES

INVENTORS
Mathias Alfred Biver
Alfred Eugène Hénard
BY
Howson and Howson
ATTORNEYS

United States Patent Office.

MATHIAS ALFRED BIVER AND ALFRED EUGÈNE HÉNARD, OF PARIS, FRANCE.

CHAMBER WITH MIRROR WALLS.

SPECIFICATION forming part of Letters Patent No. 656,927, dated August 28, 1900.

Application filed May 22, 1900. Serial No. 17,613. (No model.)

*To all whom it may concern:*

Be it known that we, MATHIAS ALFRED BIVER, engineer, residing at 9 Rue Sainte Cecile, and ALFRED EUGÈNE HÉNARD, architect, residing at 58 Rue Saint Lazare, Paris, France, have invented an Improvement Relating to Polygonal Chambers with Reflecting-Walls, of which the following is a specification.

The present invention refers to polygonal chambers composed of a certain number of walls furnished with glasses or mirrors, and more especially to those in which the walls make with one another angles of sixty degrees, ninety degrees, or one hundred and twenty degrees—that is to say, those which give by reflection the impression of a space repeated indefinitely in every direction with the same interior decoration.

It has for its object the arrangement of vertical luminous beams sent up upon the lines bisecting the angles made by the reflecting-walls at equal distances from the center of the chamber, with a view to obtaining the special effects mentioned hereinafter and other analogous effects.

The accompanying drawings represent the application of our invention to a chamber composed of six reflecting-walls, making, consequently, with one another angles of one hundred and twenty degrees.

Figure 1:
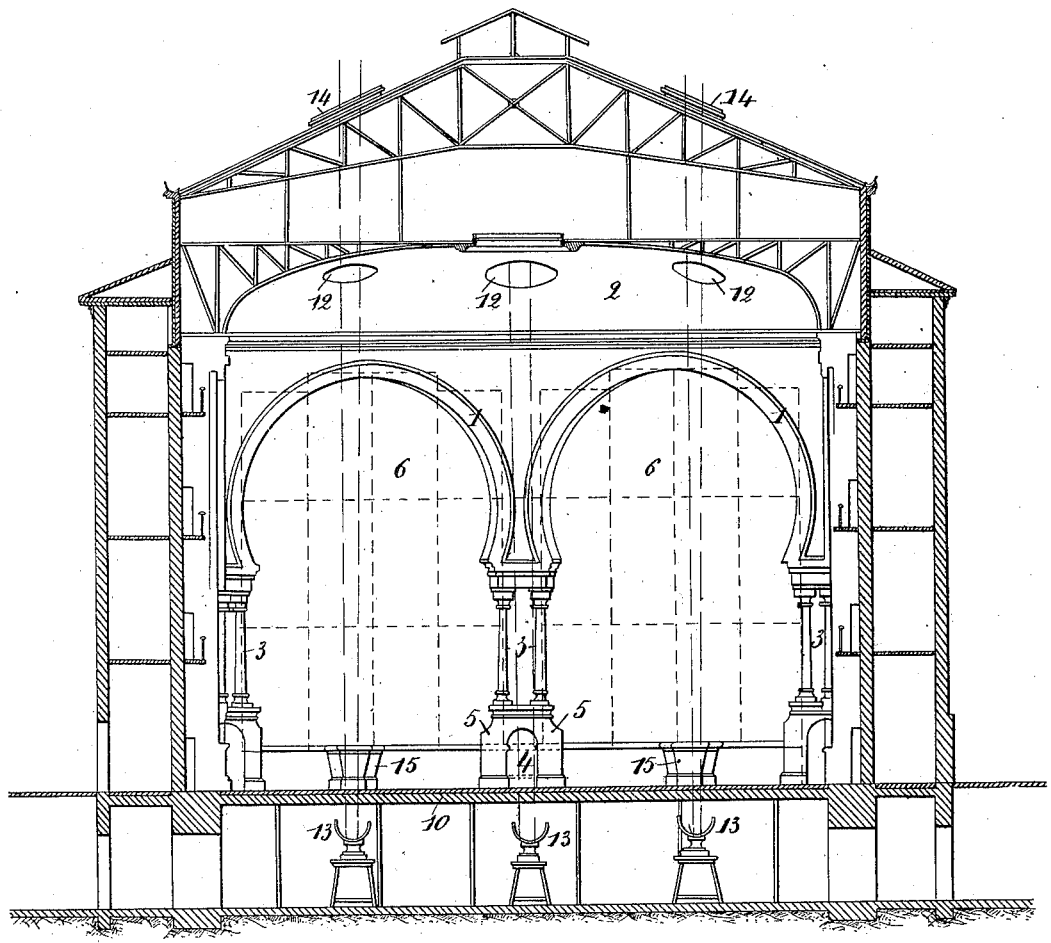
Figure 2:
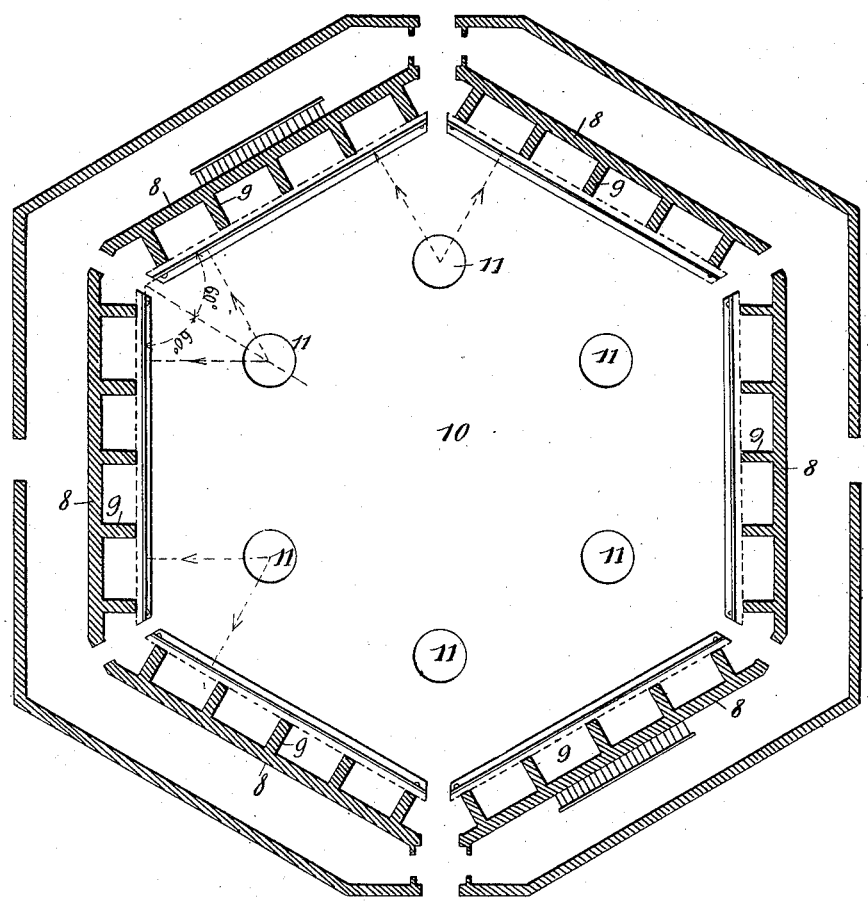

Figure 1 is a vertical section of the chamber. Fig. 2 is a plan view of the same.

The chamber represented in the drawings is, by supposition, decorated by six arcades 1, supporting an elliptically-vaulted roof 2. In the pedestals 5 of the columns 3 of the arcades are arranged entrance-doors 4.

Each reflecting-wall consists of a mirror or, where the chamber is of large proportions, of a number of mirrors 6, placed side by side and supported behind the arcades 1 on the walls 8 by the buttresses 9.

The floor 10 of the chamber is pierced by six openings 11, about five feet in diameter, at the lines bisecting the angles of the chamber at equal distances from the center, so that the vertical line up through the center of each opening can be projected perpendicularly upon each of the reflecting-walls behind the decorative devices, (columns, pedestals, or arches.) The roof above is likewise pierced with openings 12 of equal dimensions placed vertically above the first.

In the basement of the chamber are six electric projectors 13, sending out six conical luminous beams to illuminate the entire roof, which is decorated, or else sending out six cylindrical beams, which pass through the upper holes in the roof and lose themselves in the space below the glass roofing 14, covered with transparent glass. The projectors are hidden by screens 15, surrounding the openings at a sufficient height. When the diverging beams of light are used, an illumination of the wall is obtained without any apparent light, which illumination is multiplied by the repetition of the mirrors without any flickering.

When the cylindrical beams which pass through the roof are made use of, the chamber is plunged in semidarkness, and one has only to suspend any objects in these beams by means of ropes and pulleys animating them by an up-and-down movement to obtain the impression of a multitude of moving objects, filling space indefinitely, (birds, insects, dancing-girls, and luminous apparatus of various sorts,) each of the six suspended objects being by rights at a different level from the other five. Instead of suspending these objects they can be let fall from above, and thus may be obtained among others the effects of an infinite cascade of glittering objects, (flowers, metal shavings, spiral jets of water, &c.)

All the effects obtained by the above-described methods, as well as the direct effects of lights by means of fountains or garlands of flowers, may be combined with one another to a musical rhythm produced by an orchestra or automatic instrument placed below the floor and invisible. Thus we make aerial ballets, fairy illuminations, and theatrical representations of an absolutely-new kind, the public being in all parts of the hall and able to receive the same sensation of light wherever they look.

We claim as our invention—

1. The combination of a polygonal chamber having reflecting-walls with means for producing vertical luminous beams upon the lines bisecting the angles of the reflecting-walls, at equal distances from the center of the chamber, as and for the purpose described.

2. A polygonal chamber having reflecting-walls and a floor and ceiling with corresponding openings with projectors below the openings in the floor, substantially as described.

In testimony whereof we have signed our names to this specification in the presence of two subscribing witnesses.

MATHIAS ALFRED BIVER.
ALFRED EUGÈNE HÉNARD.

Witnesses:
CHARLES DONY,
EDWARD P. MACLEAN.